(12) United States Patent
Kim

(10) Patent No.: US 9,599,135 B1
(45) Date of Patent: Mar. 21, 2017

(54) FASTENING APPARATUS AND METHOD FOR FASTENING A COMPONENT TO A MATERIAL OF AN ACCESSORY

(71) Applicant: Hong Kwan Kim, Seoul (KR)

(72) Inventor: Hong Kwan Kim, Seoul (KR)

( * ) Notice: Subject to any disclaimer, the term of this patent is extended or adjusted under 35 U.S.C. 154(b) by 0 days.

(21) Appl. No.: 15/073,113

(22) Filed: Mar. 17, 2016

(51) Int. Cl.

| | | |
|---|---|---|
| F16B 5/12 | (2006.01) | |
| A45C 1/02 | (2006.01) | |
| A45C 1/06 | (2006.01) | |
| A41F 9/00 | (2006.01) | |
| A42B 1/00 | (2006.01) | |
| A45F 3/00 | (2006.01) | |
| G09F 3/06 | (2006.01) | |

(52) U.S. Cl.
CPC .............. *F16B 5/126* (2013.01); *A41F 9/002* (2013.01); *A42B 1/004* (2013.01); *A45C 1/02* (2013.01); *A45C 1/06* (2013.01); *A45F 3/00* (2013.01); *G09F 3/06* (2013.01)

(58) Field of Classification Search
CPC ............ A44B 17/0052; A44B 17/0064; A44B 17/0076; A44B 17/0088; A44B 17/0094; A44B 17/007; A44B 17/0082; A44B 17/0047; A44B 17/00; A44B 17/0005; A44B 17/0023; A44B 17/0029; A44D 2201/10–2201/50; A43B 3/0078; A43B 23/24; A42B 1/004; Y10T 24/45916; Y10T 24/45932; Y10T 24/49; Y10T 24/492; Y10T 24/493; Y10T 24/497; F16B 5/126; A45C 13/08
See application file for complete search history.

(56) References Cited

U.S. PATENT DOCUMENTS

| | | | | |
|---|---|---|---|---|
| 3,401,434 | A * | 9/1968 | Daddona, Jr. ...... | A44B 17/0029 24/689 |
| 3,685,105 | A * | 8/1972 | Carlile ............... | A44B 17/0029 24/594.11 |
| 3,925,860 | A * | 12/1975 | Furuya ............... | A44B 17/0029 24/687 |
| 4,253,226 | A * | 3/1981 | Takeda ............... | A44B 17/0035 24/691 |
| 4,296,533 | A * | 10/1981 | Doerter .............. | A44B 17/0058 24/581.1 |
| 4,608,734 | A * | 9/1986 | Schiller .............. | A44B 17/0005 24/104 |

(Continued)

FOREIGN PATENT DOCUMENTS

| | | | | |
|---|---|---|---|---|
| DE | 2035735 | A1 * | 4/1972 | ......... A44B 17/0005 |

*Primary Examiner* — Daniel Wiley

(57) ABSTRACT

A fastening apparatus includes a first part comprising a plurality of first projections and a plurality of first holes. A washer part comprises a plurality of second holes corresponding to the plurality of first projections and a plurality of openings corresponding to the plurality of first holes. The washer part and the first part are positioned on a first side of a first material of a product. A second part having a plurality of second projections is positioned on a second side of the first material. Each of the plurality of second projections penetrates a respective opening of the washer part, wherein penetration by each second projection of the corresponding opening causes a deformation of a portion of a second material of the washer part proximate to the corresponding opening.

14 Claims, 13 Drawing Sheets

(56) References Cited

U.S. PATENT DOCUMENTS

| | | | | |
|---|---|---|---|---|
| 4,777,704 A | * | 10/1988 | Acker | A44B 17/0082 24/106 |
| 4,982,480 A | * | 1/1991 | Kasai | A44B 17/0029 24/104 |
| 5,016,368 A | * | 5/1991 | Cassata | G09F 3/12 24/108 |
| 5,173,997 A | * | 12/1992 | Takezawa | B60R 22/023 24/104 |
| 5,575,043 A | * | 11/1996 | Candotti | A44B 1/34 24/103 |
| 6,925,692 B2 | * | 8/2005 | Yang | A44B 17/0052 24/681 |

* cited by examiner

FASTENING APPARATUS AND METHOD FOR FASTENING A COMPONENT TO A MATERIAL OF AN ACCESSORY

TECHNICAL FIELD

This specification relates generally to fasteners, and more particularly to a fastening apparatus and method for attaching a component to a material of an accessory such as a purse, wallet, bag, belt, hat, etc.

BACKGROUND

Many products such as purses, wallets, bags, belts, hats, shoes, and other clothing and accessories have logos, names, symbols, or emblems attached to their surfaces in a manner that ensures a luxurious and elegant appearance and helps to increase the product's marketability. For example, a logo, name, symbol, or emblem may be engraved on a component such as a metal plate or tag, which is then attached to the surface of the product. In some cases, a metal plate displaying a logo, name, symbol, or emblem is attached to the product's surface (which may be made of leather, plastic, etc.) using an adhesive. In other products, a metal plate displaying the logo, name, symbol, or emblem includes a male or female component of an attachment mechanism. A hole is drilled through the product's material, and the plate is coupled to a corresponding male or female component in order to affix the metal plate to the product's surface. However, these existing methods have several disadvantages. For example, use of adhesives can be unreliable and does not guarantee permanent adhesion. Many components (such as male/female components) which are joined by force are vulnerable to subsequent separation by a strong pull or powerful impact.

SUMMARY

In accordance with an embodiment, a washer part is attached to a first part, wherein the first part comprises a plurality of first projections and a plurality of first holes, wherein the washer part comprises a plurality of second holes corresponding to the plurality of first projections and a plurality of openings corresponding to the plurality of first holes, wherein each first projection of the first part fits through a corresponding second hole of the washer part. The washer part and the first part are positioned on a first side of a first material of a product. A second part having a plurality of second projections is positioned on a second side of the first material. Each of the plurality of second projections is caused to penetrate a respective opening of the washer part and a respective first hole of the first part, wherein penetration by each second projection of the corresponding opening of the washer part causes a deformation of a portion of a second material of the washer part proximate to the corresponding opening, wherein the deformed second material exerts a force on the second projection and prevents removal of the second projection from the corresponding opening.

In one embodiment, a portion of each respective first projection is flattened to cause an end portion of the respective first projection to have a first width that is greater than a second width of the corresponding first hole of the washer part.

In another embodiment, each respective second projection has a first width that is greater than a second width of the corresponding opening of the washer part.

In another embodiment, each opening of the washer part has a shape of a letter "X."

In another embodiment, the washer part is made of metal or plastic.

In another embodiment, the washer part is made of steel.

In accordance with another embodiment, an apparatus for fastening is provided. The apparatus includes a first part disposed on a first side of a layer of a material, the first part comprising a plurality of first projections and a plurality of first holes, and a washer part comprising a plurality of second holes corresponding to the plurality of first projections, wherein each first projection of the first part fits through a corresponding one of the plurality of second holes, and a plurality of openings corresponding to the plurality of first holes of the first part. The apparatus also includes a second part disposed on a second side of the layer of material, the second part having a plurality of second projections, wherein each of the plurality of second projections penetrates a respective one of the plurality of openings of the washer part, wherein a portion of a second material of the washer part proximate to each opening is deformed and exerts a force on the second projection that passes through the respective opening, wherein the force prevents removal of the second projection from the respective opening.

In one embodiment, each first projection of the first part has a first portion that fits through a corresponding second hole of the washer part and a second portion having a first width greater than a second width of the corresponding second hole.

In another embodiment, the first part comprises a first central hole, and the plurality of first projections are disposed symmetrically around the first central hole at respective first locations. The washer part comprises a second central hole, the plurality of second holes are arranged symmetrically around the second central hole at respective second locations that correspond to respective first locations, and the plurality of openings are arranged symmetrically around the second central hole.

In another embodiment, the second part includes a first side and a second side, wherein the second projections are disposed on the first side, wherein the second side comprises an engraved logo, name, symbol or emblem.

In accordance with another embodiment, a product includes an apparatus for fastening similar to that described herein. The fastening apparatus is attached to a material of the product and includes a metal plate displaying an engraved logo, name, emblem, symbol, etc. The product may be a purse, a wallet, a bag, a belt, or a hat. The material of the product may be made of leather, plastic, etc.

These and other aspects of the present Invention will be more fully understood by reference to one of the following drawings.

DETAILED DESCRIPTION OF THE INVENTION

In accordance with an embodiment, a fastening apparatus includes a first part, a washer part, and a second part.

Figure 1A:
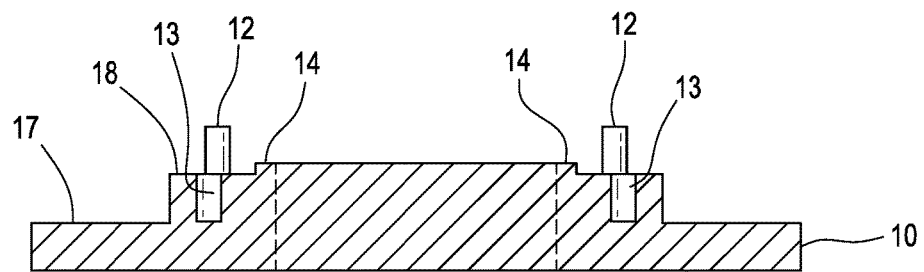
FIG. 1A shows a cross-section of a first part of a fastening apparatus in accordance with an embodiment.
Figure 1B:
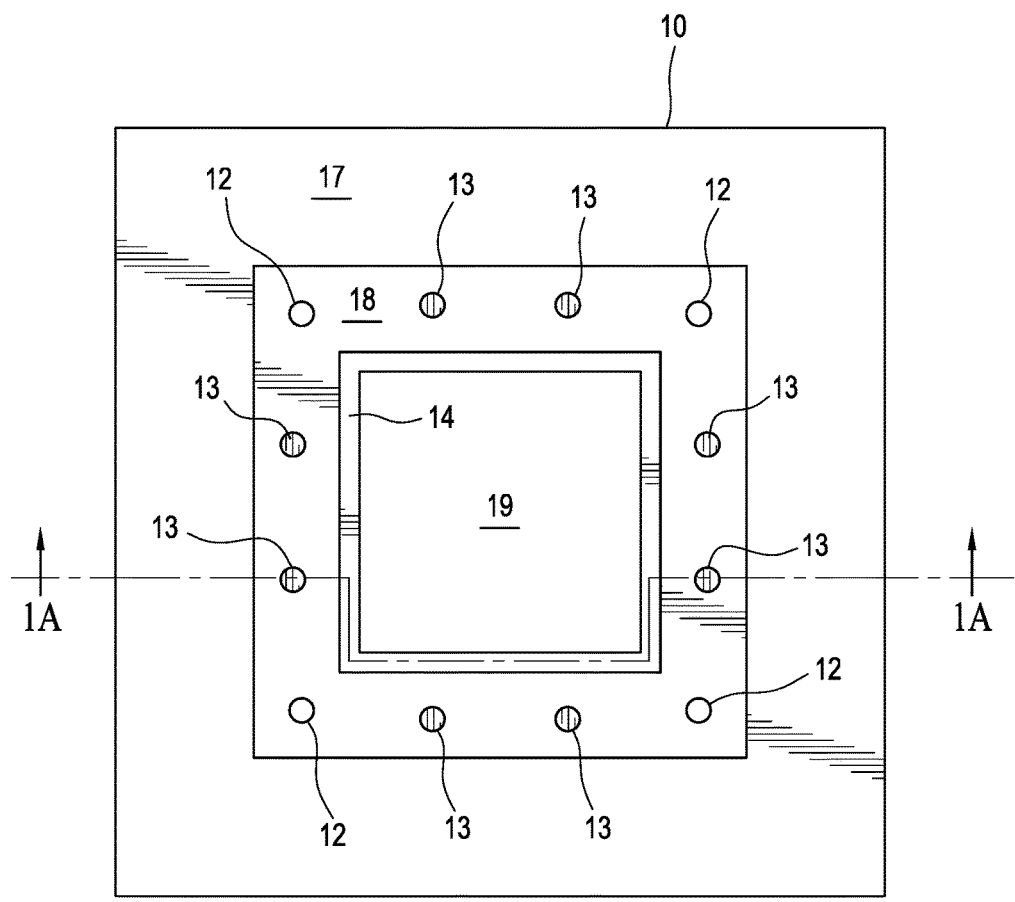
FIG. 1B shows a top view of a first part of a fastening apparatus in accordance with an embodiment.

FIGS. 1A-1B show a first part 10 in accordance with an embodiment. FIG. 1A shows a cross-section of a first part 10. FIG. 1B shows a top view of first part 10.

First part 10 includes a square metal plate having a first surface 17, a second surface 18 which is raised relative to first surface 17, and a third surface 14 which is raised relative to second surface 18. In the illustrative embodiment, first surface 17, second surface 18, and third surface 14 are symmetrical and surround a central hole 19. In the illustrative embodiment, third surface 14 constitutes a rim around central hole 19.

First part 10 may be made of a metal such as steel, for example. In other embodiments, first part 10 may be made of another material. For example, first part 10 may be made of plastic, rubber, etc.

While in the illustrative embodiment, first part 10 is square in shape, in other embodiments first part 10 may have other shapes. For example, first part 10 may be rectangular, triangular, circular, oval, or irregular in shape. In some embodiments, first part 10 is uniformly solid and does not include a hole.

First part 10 includes a plurality of first projections 12 which project from second surface 18. First projections 12 extend from second surface 18 and extend above third surface 14. First part 10 also includes a plurality of first holes 13 located in second surface 18.

In the illustrative embodiment of FIGS. 1A-1B, first projections 12 are located at the four corners of central hole 19, and respective pairs of first holes 13 are located on each side of central hole 19. In other embodiments, first projections 12 may be located in other locations on second surface 18, and first holes 13 may be located in other locations on second surface 18. Similarly, while in the illustrative embodiment, first part 10 includes four first projections 12 and eight first holes 13, in other embodiments, first part 10 may include any number of first projections 12 and any number of first holes 13.

Figure 2A:
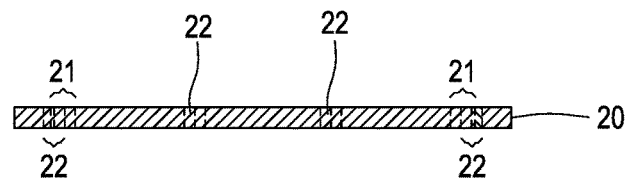
FIG. 2A shows a cross-section of a washer part of a fastening apparatus in accordance with an embodiment.
Figure 2B:
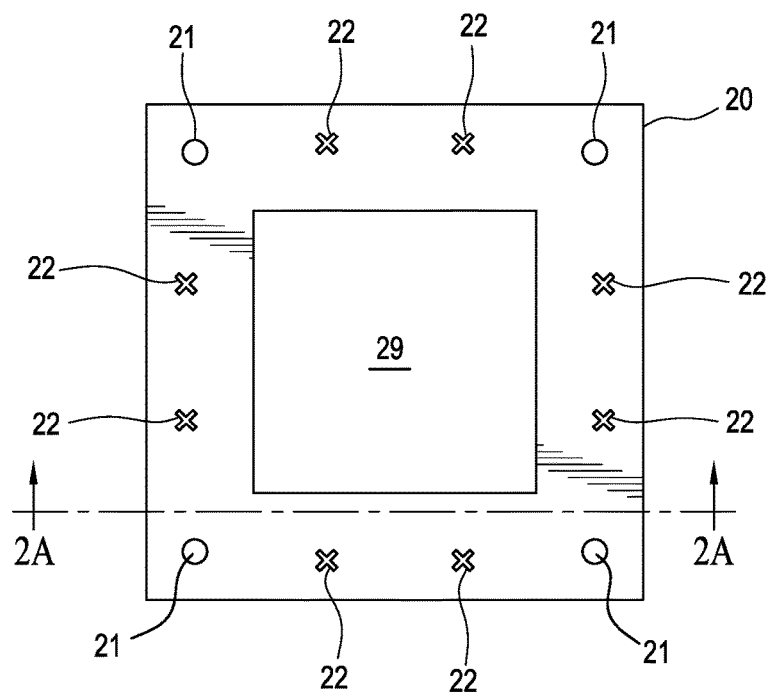
FIG. 2B shows a top view of a washer part of a fastening apparatus in accordance with an embodiment.

FIGS. 2A-2B show a washer part 20 in accordance with an embodiment. FIG. 2A shows a cross-section of washer part 20. FIG. 2B shows a top view of washer part 20.

In the illustrative embodiment, washer part 20 is a square plate having a central hole 29. In other embodiments, washer part 20 may have a different shape. In one embodiment, washer part 20 is made of a metal having a desired degree of elasticity. For example, washer part 20 may be made of steel. In other embodiments, washer part 20 is made of another material, such as plastic. In other embodiments, washer part 20 is uniformly solid and does not include a central hole.

Washer part 20 includes a plurality of second holes 21. The locations of second holes 21 correspond to the locations of first projections 12 of first part 10. Second holes 21 are adapted to receive first projections 12. Accordingly, in the illustrative embodiment, washer part 20 includes four second holes located at the four corners of central hole 29.

Washer part 20 also includes a plurality of openings 22. The locations of openings 22 correspond to the locations of first holes 13 of first part 10. Accordingly, in the illustrative embodiment, washer part 20 includes respective pairs of openings 22 located on each side of central hole 29. Each opening 22 is a hole having a selected shape. In the illustrative embodiment, each opening 22 is a hole in the shape of a letter "X."

Figure 3A:
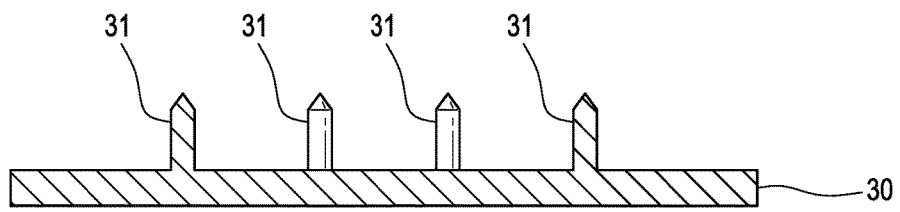
FIG. 3A shows a cross-section of a second part of a fastening apparatus in accordance with an embodiment.
Figure 3B:
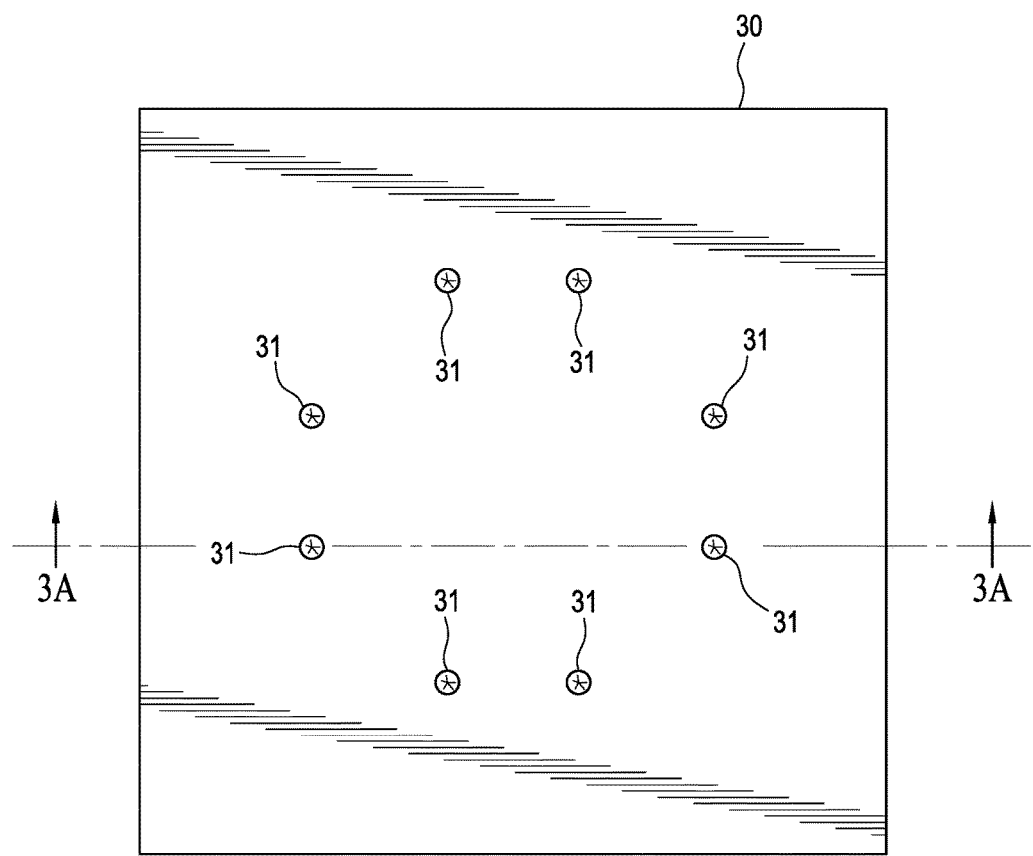
FIG. 3B shows a bottom view of a second part of a fastening apparatus in accordance with an embodiment.
Figure 3C:
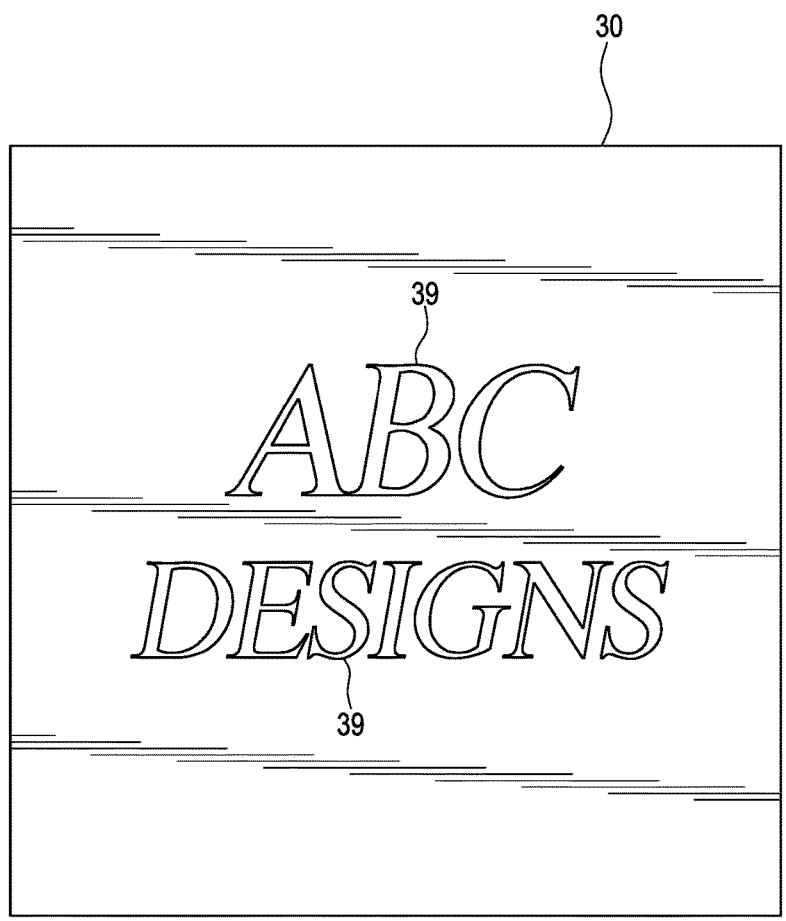
FIG. 3C shows a top view of a second part of a fastening apparatus in accordance with an embodiment.

FIGS. 3A-3C show a second part 30 in accordance with an embodiment. FIG. 3A shows a cross-section of second part 30. FIG. 3B shows a bottom view of second part 30. FIG. 3C shows a top view of second part 30.

Referring to FIGS. 3A-3B, second part 30 includes a metal plate of a desired shape and size. Second part 30 may be made of metal, for example. A first side of the plate includes a plurality of second projections 31, as shown in FIGS. 3A-3B. The locations of second projections 31 correspond to the locations of openings 22 of washer part 20 and to the locations of first holes 13 of first part 10. Therefore, second part 30 includes respective pairs of second projections 31 aligned with each respective side of second part 30. Referring to FIG. 3C, a second side of second part 30 opposite the first side includes a design, which may be an engraved name, logo, symbol, or emblem, for example.

In one embodiment, second part 30 is made of steel. In other embodiments, second part 30 may be made of another material such as plastic, rubber, etc.

In accordance with an embodiment, each opening 22 of washer part 20 has a width that is smaller than a width of the corresponding second projection 31 of second part 30.

While in the illustrative embodiment, openings 22 have the shape of the letter "X," in other embodiments, an opening 22 may have a different shape. For example, an opening 22 may have a shape of a letter "Y," a shape of an asterisk "*," a shape of a star, a shape of a slit (i.e. a short line), etc. Alternatively an opening 22 may have a circular shape, an oval shape, or an irregular shape. Other shapes may be used.

In accordance with an embodiment, the fastening apparatus described herein may be used to attach a part displaying an engraved logo, name, symbol, or emblem (such as second part 30 shown in FIGS. 3A-3C) is to a surface of a product (such as a purse, bag, etc.).

Figure 4A:
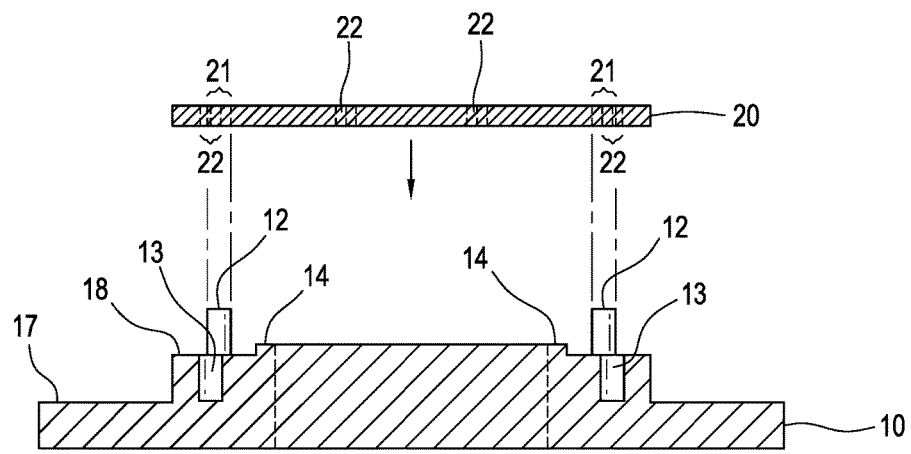
FIGS. 4A-4C illustrate a method of attaching a washer part of a fastening apparatus to a first part of the fastening apparatus in accordance with an embodiment.
Figure 4B:
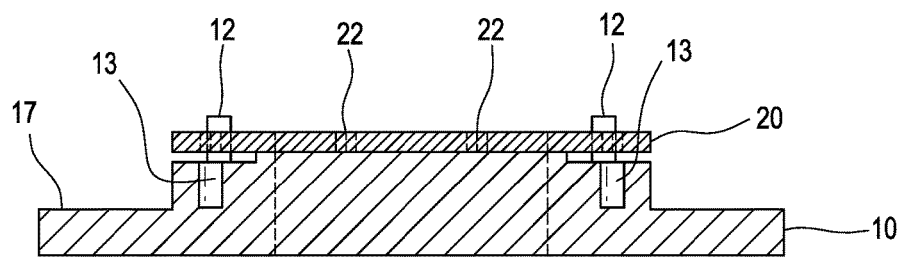
Figure 4C:
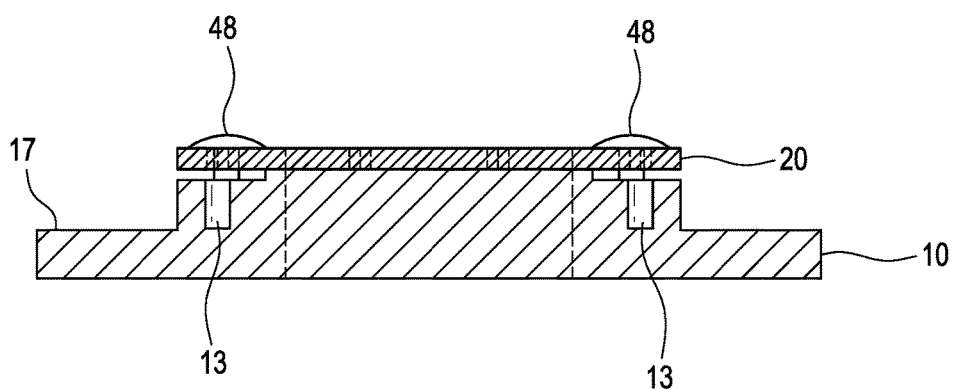

In accordance with an embodiment, washer part 20 is first attached to first part 10. FIGS. 4A-4C illustrate a method of attaching washer part 20 to first part 10 in accordance with an embodiment. Referring to FIG. 4A, washer part 20 is positioned above first part 10 so that second holes 21 of washer part 20 are aligned with first projections 12 of first part 10. Washer part 20 is then lowered onto first part 10. FIG. 4B shows a cross-section of first part 10 and washer part 20 in a combined configuration. In the configuration illustrated in FIG. 4B, washer part 20 rests on surface 18 of first part 10. Central hole 29 of washer part 20 fits around, and is held in place by, the rim formed by third surface 14 of first part 10. Each first projection 12 of first part 10 passes through a corresponding second hole 21 of washer part 20, and an end portion of each respective first projection 12 sticks out of the corresponding second hole 21 and projects above the top surface of washer part 20.

In accordance with an embodiment, the end portion of each first projection 12 is now flattened and widened. Specifically, the end portion of each first projection 12 which sticks out of a corresponding second hole 21 and projects above washer part 20 is flattened so that the width of the end portion increases and becomes wider than the width of the respective second hole 21 through which it passes, as shown in FIG. 4C. First projections 12 may be flattened using any suitable method. For example, a hammer or similar tool may be used to flatten the end portion of each first projection 12. Alternatively, pliers or a similar tool may be used to flatten the end portion of each first projection 12. After being flattened, each first projection 12 has a first portion that fits through a corresponding second hole 21 of washer part 20 and a second portion 48 having a first width greater than a second width of the corresponding second hole 21. The flattened second portion 48 is visible on one side of washer part 20, as shown in FIG. 4C.

Because the width of the flattened second portion 48 of each first projection 12 is now wider than the second hole 21 through which it passes, washer part 20 cannot be removed from first part 10. Accordingly, washer part 20 is now securely attached to first part 10.

Figure 5A:
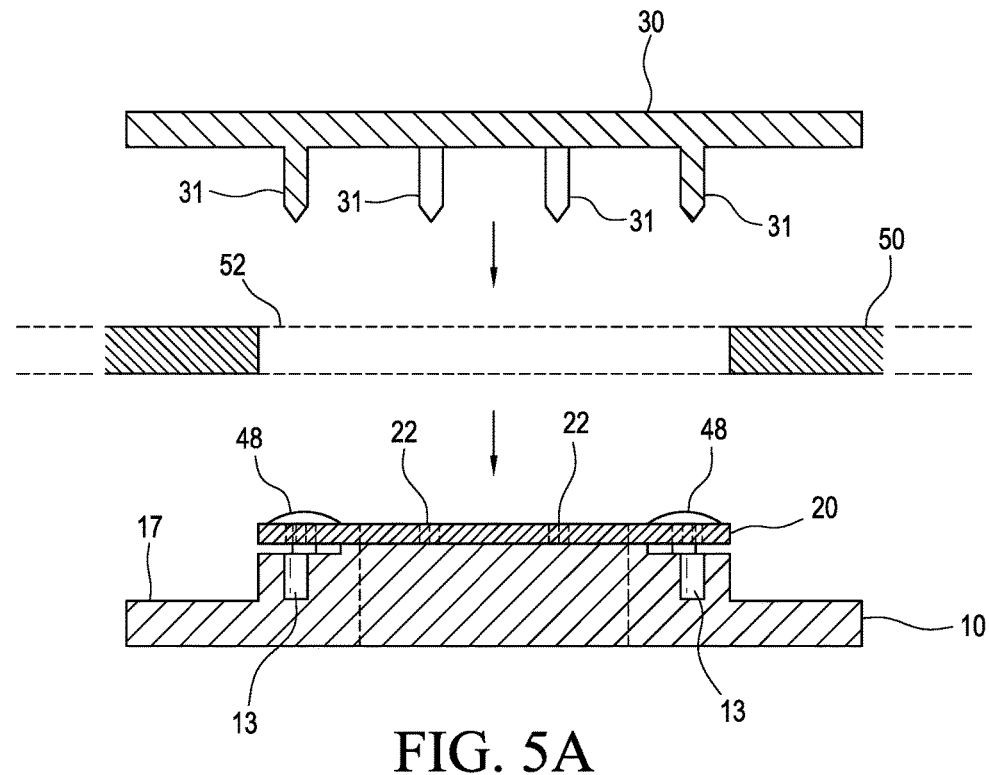
FIGS. 5A-5B illustrate a method of attaching a second part of a fastening apparatus to a material of a product in accordance with an embodiment.
Figure 5B:
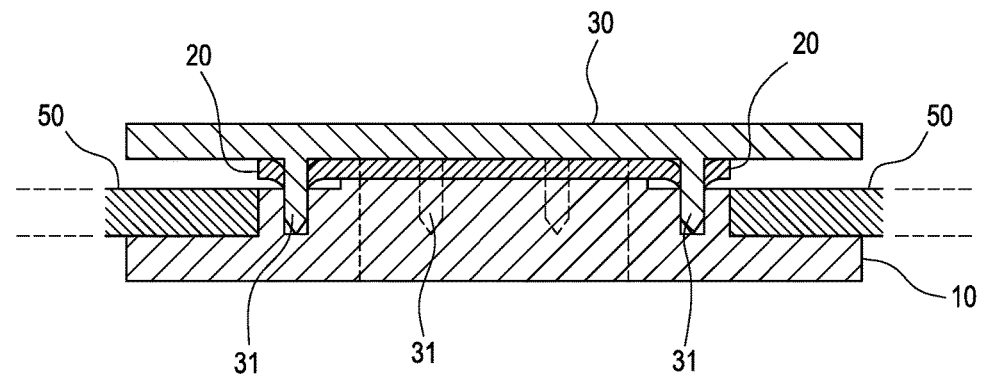

FIGS. 5A-5B illustrate a method of attaching a second part of a fastening apparatus to a material of a product in accordance with an embodiment. Referring to FIG. 5A, the combined washer part 20/first part 10 is positioned on a first side of a material 50 (which may be, for example, a portion of leather on the side of a leather bag) In the illustrative embodiment, material 50 includes a hole 52 having a size corresponding to the size of washer part 20.

Second part 30 is positioned on a second side of the material 50 (opposite the first side), with second projections 31 directed toward the material 50. Second part 30 is positioned so that second projections 31 are aligned with the openings 22 of washer part 20 and with first holes 13 of first part 10.

Referring to FIG. 5B, the first part 10/washer part 20 combination and second part 30 are then brought together and into contact with material 50. In the illustrative embodiment, washer part 20 passes through hole 52 of material 50.

Sufficient pressure is now applied to second part 30 to cause second projections 31 to penetrate through the openings 22 of washer part 20 and to penetrate into first holes 13 of first part 10.

Figure 6A:
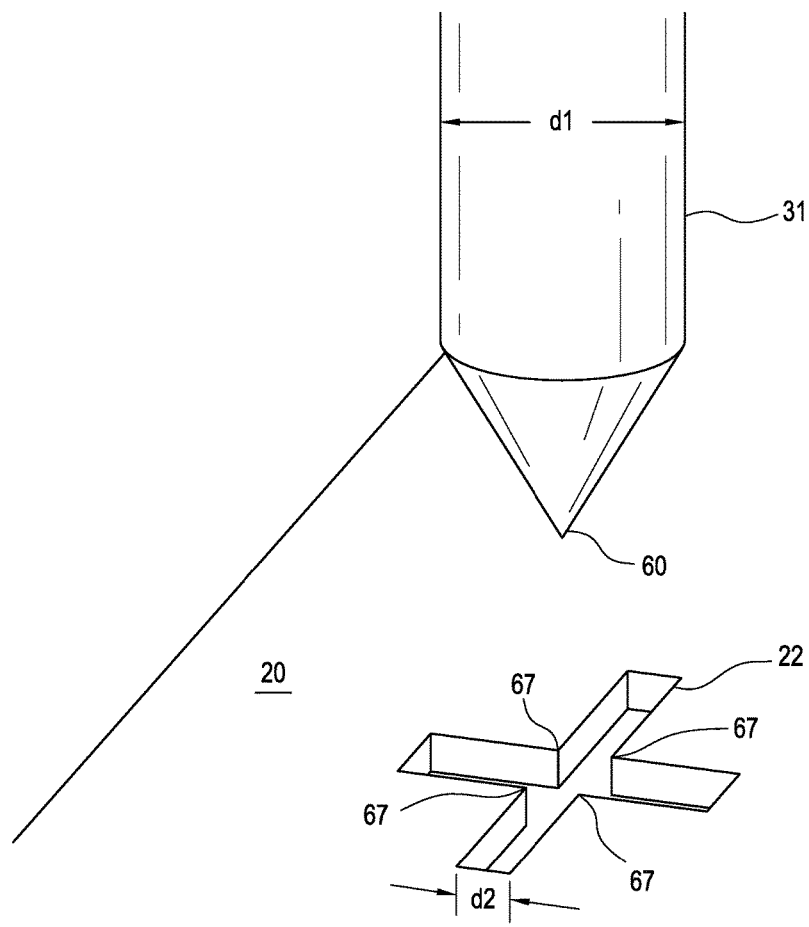
FIG. 6A shows a second projection of a second part and an opening of washer part of a fastening apparatus in accordance with an embodiment.
Figure 6B:
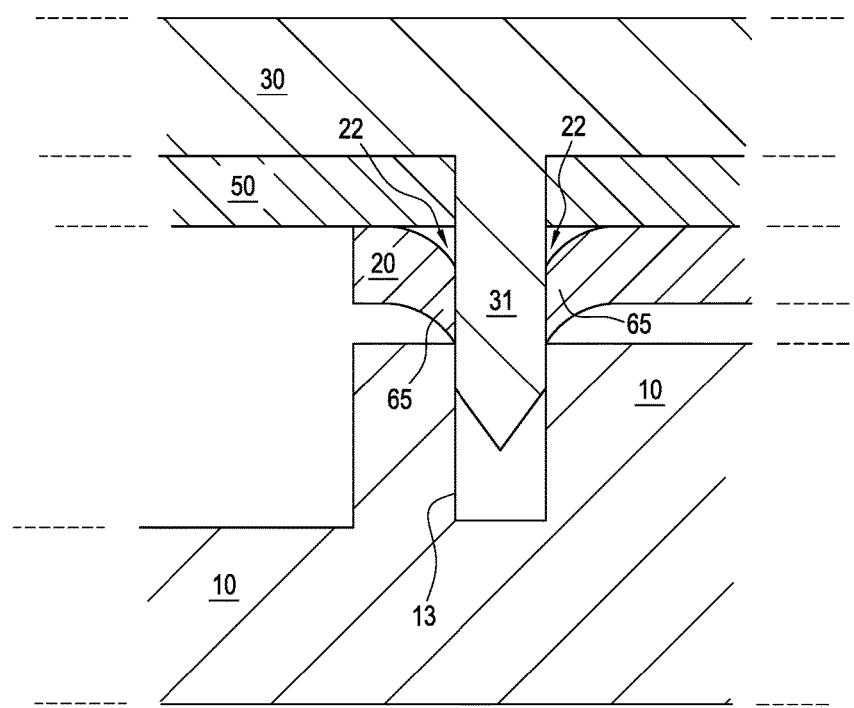
FIG. 6B shows a second projection of a second part of a fastening apparatus penetrating an opening of a washer part of the fastening apparatus, and deformed portions of the washer part that are proximate to the opening, in accordance with an embodiment.

FIG. 6A shows a second projection 31 of second part 30 and an opening 22 of washer part 20. Opening 22 of washer part 20 has an "X" shape and therefore includes four corners 67 near the center of the "X" shape. A width (d2) of opening 22, defined in this example as the distance between two non-opposing corners 67, is smaller than the width (d1) of the second projection 31. Accordingly, second projection 31 does not pass readily through opening 22. However, when an amount of force or pressure sufficient to deform the metal of washer part 20 and force the second projection 31 through the opening 22 is applied, then one or more portions of washer part 20 bend as second projection 31 passes through opening 22. Referring to FIG. 6B, one or more portions 65 of washer part 20 that are proximate to opening 22 are deformed (e.g., bend). For example, referring again to FIG. 6A, the material proximate to corners 67 may bend as second projection 31 passes through opening 22. The deformed material 65 of washer part 20 may bend downward toward or into first hole 13 of first part 10, as shown in FIG. 6B.

Referring to FIG. 6B, because the material of washer part 20 is elastic, the deformed portions 65 of washer part 20 tighten around the second projection 31 and exert a substantial force on second projection 31. This force exerted on second projection 31 prevents second projection 31 from being removed from the opening 22 (and from first hole 13). In this manner, second part 30 is securely connected to washer part 20 and to first part 10.

In the illustrative embodiment, washer part 20 is made of a metal (e.g., steel) that is strong and hard yet sufficiently flexible and elastic to bend under pressure. In other embodiments, washer part 20 may be made of other materials (e.g., a plastic material) having similar qualities.

Figure 7:
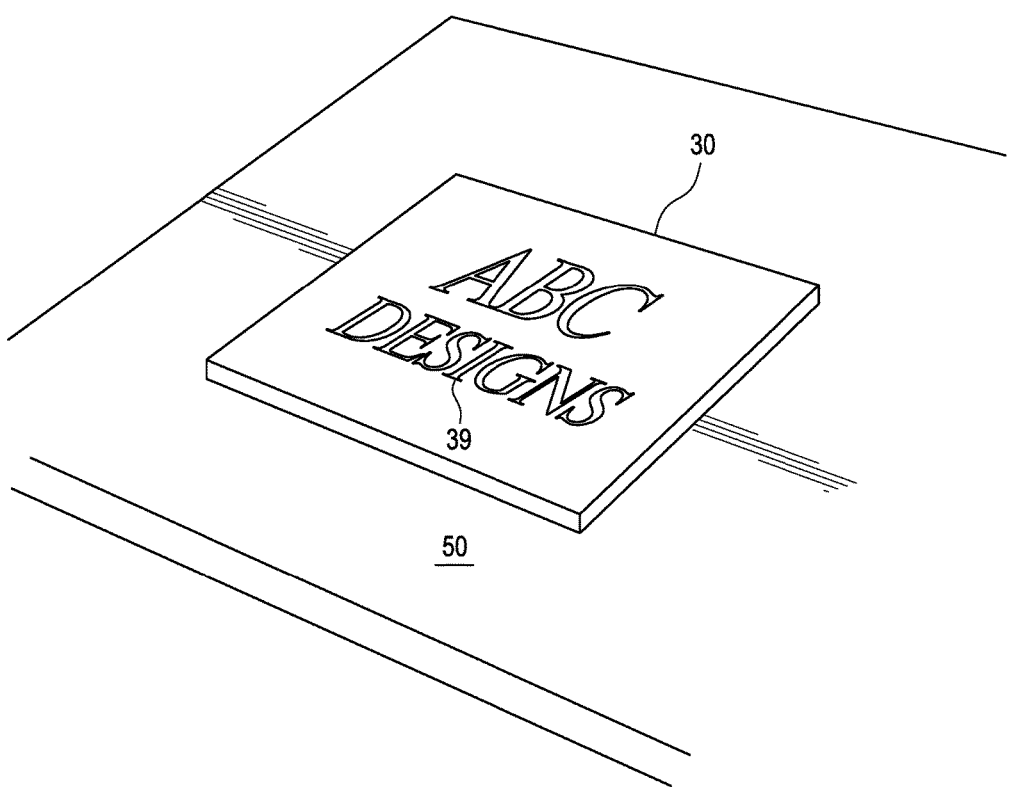
FIG. 7 shows a perspective view of a second part of a fastening apparatus attached to the material of a product in accordance with an embodiment.

Advantageously, when first part 10, washer part 20, and second part 30 are attached to a material 50 of a product in the manner described herein, second part 30 cannot be easily removed from the washer part 20/first part 10 combination. Accordingly, the second part 30 (which includes an engraved logo or name, for example) is affixed to the material of the product. FIG. 7 shows a perspective view of second part 30 (with an engraved name/logo) attached to the material 50 of a product in accordance with an embodiment.

Figure 5C:
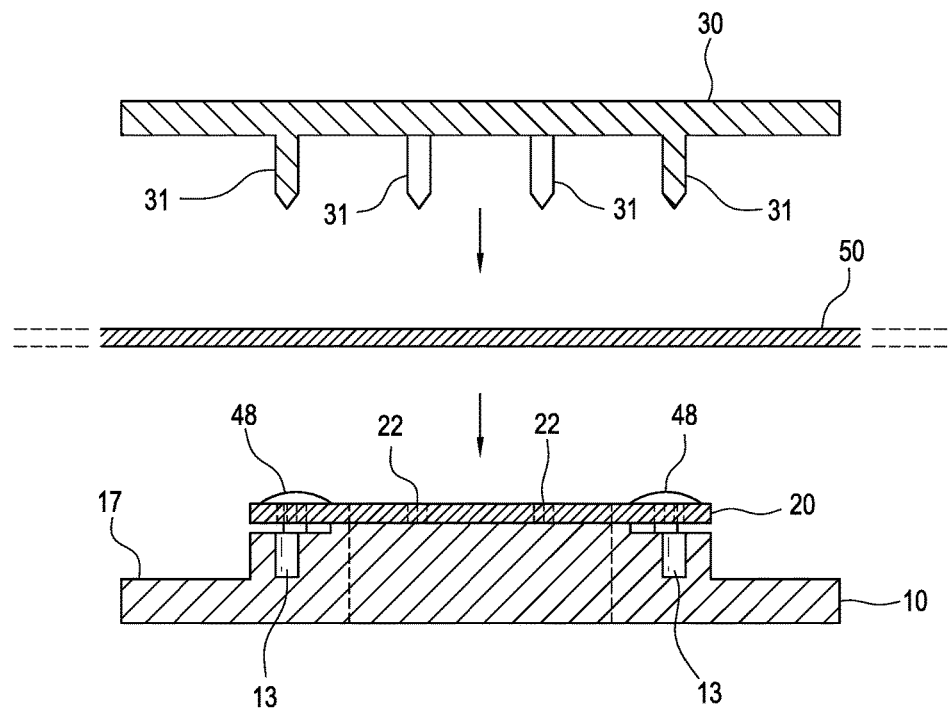
FIGS. 5C-5D illustrate a method of attaching a second part of a fastening apparatus to a material of a product in accordance with another embodiment.
Figure 5D:
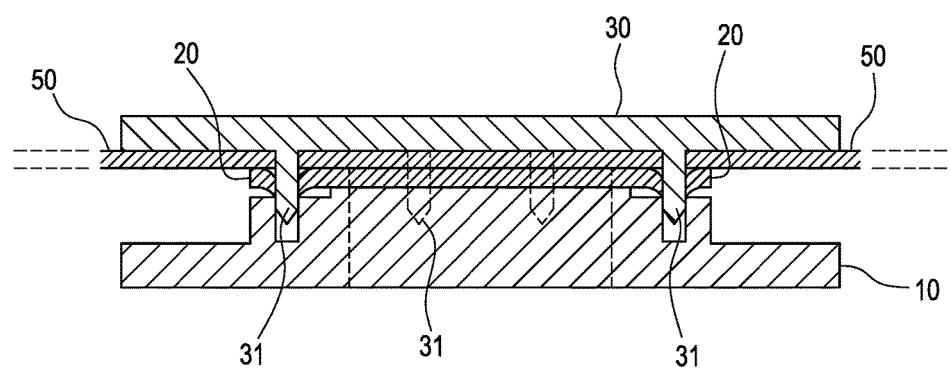

FIGS. 5C-5D illustrate a method of attaching a second part to a surface of a product in accordance with another embodiment. Referring to FIG. 5C, a material 50 is positioned above the joined first part 10/washer part 20 combination. Second part 30 is positioned above the material 50, with second projections 31 directed toward the material 50. Second projections 31 are aligned with the openings 22 of washer part 20 and with first holes 13 of first part 10.

Referring to FIG. 5D, the material 50 is brought into contact with the first part 10/washer part 20 combination, and second part 30 is then brought into contact with material 50. Sufficient pressure is applied to second part 30 to cause second projections 31 to penetrate material 50 and then pass through openings 22 of washer part 20 and first holes 13 of first part 10, as shown in FIG. 5D. Material 50 may have several holes corresponding to and aligned with second projections 31 to allow second projections to pass through. In other embodiments, second projections 31 are forced through the material 50 of the product.

Figure 8:
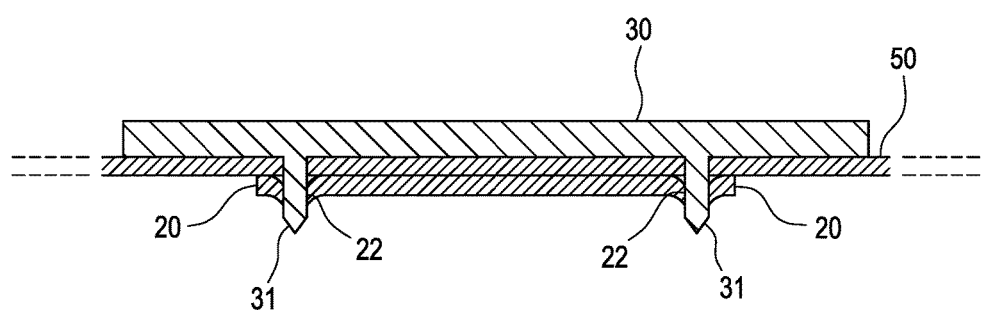
FIG. 8 shows a second part of a fastening apparatus attached to a material of a product and to a washer part in accordance with an embodiment.

In accordance with another embodiment illustrated in FIG. 8, a second part 30 may be attached to a material 50 (e.g., a side of a leather bag) and to a washer part 20 without use of any component corresponding to the first part 10. Second projections 31 of second part 30 are pushed through material 50 and through openings 22 of washer part 20. However, as shown in FIG. 8, in this embodiment, there is no component corresponding to first part 10 that is attached to washer part 20.

Figure 9:
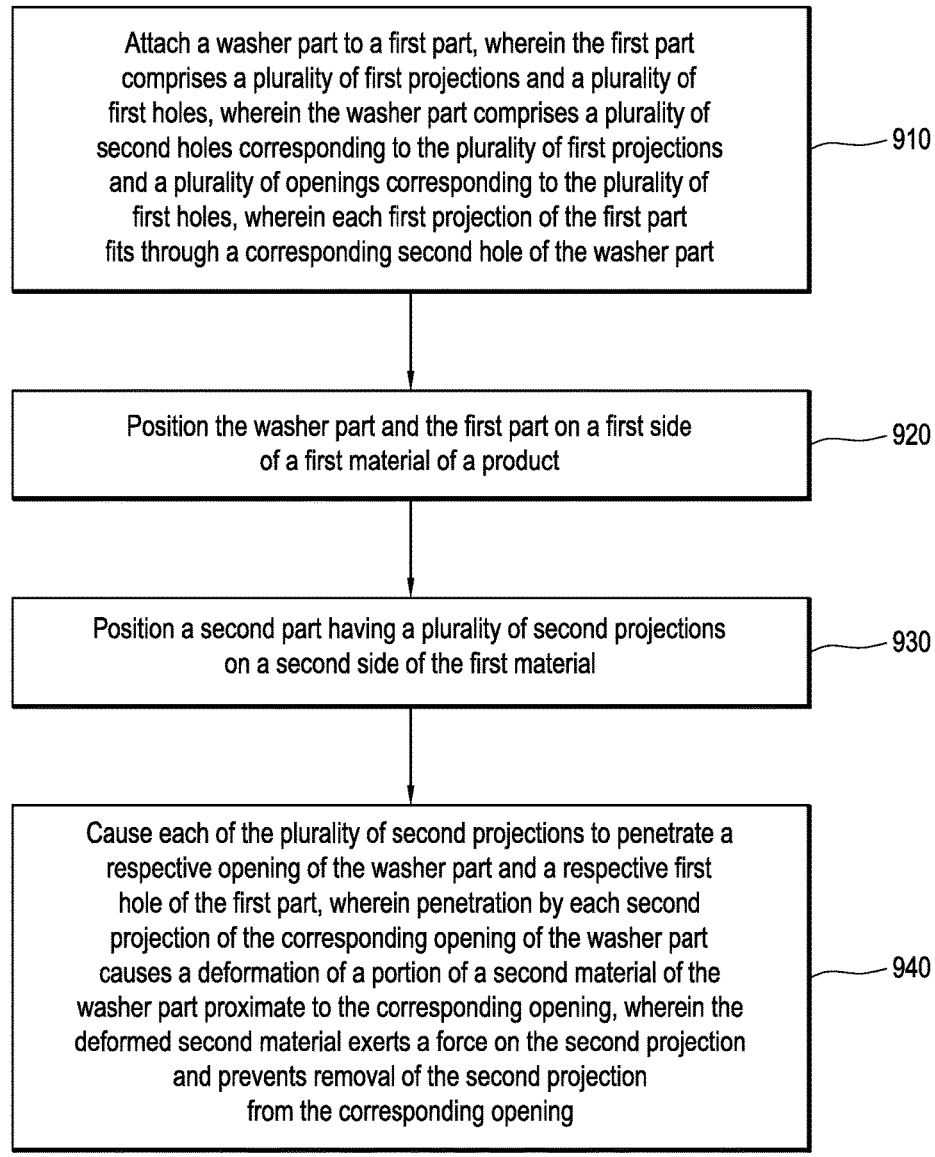
FIG. 9 is a flowchart of a method in accordance with an embodiment.

FIG. 9 is a flowchart of a method in accordance with an embodiment. At step 910, a washer part is attached to a first part, wherein the first part comprises a plurality of first projections and a plurality of first holes, wherein the washer part comprises a plurality of second holes corresponding to the plurality of first projections and a plurality of openings corresponding to the plurality of first holes, wherein each first projection of the first part fits through a corresponding second hole of the washer part. At step 920, the washer part and the first part are positioned on a first side of a first material of a product. At step 930, a second part having a plurality of second projections is positioned on a second side of the first material. At step 940, each of the plurality of second projections is caused to penetrate a respective opening of the washer part and a respective first hole of the first part, wherein penetration by each second projection of the corresponding opening of the washer part causes a deformation of a portion of a second material of the washer part proximate to the corresponding opening, wherein the deformed second material exerts a force on the second projection and prevents removal of the second projection from the corresponding opening.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

The invention claimed is:

1. A method of attaching a plate to a material, the method comprising:
    attaching a washer part to a first part, wherein:
        the first part comprises a first central hole, a plurality of first projections, and a plurality of first holes, wherein the first projections and first holes are disposed around the first central hole; and
        the washer part comprises a second central hole, a plurality of second holes corresponding to the plurality of first projections, and a plurality of openings corresponding to the plurality of first holes, wherein each first projection of the first part fits through a corresponding second hole of the washer part;
    placing the washer part and the first part on a first side of a first material of a product;
    placing a second part having a plurality of second projections on a second side of the first material;
    causing each of the plurality of second projections to penetrate a respective opening of the washer part and a respective first hole of the first part, wherein penetration by each second projection through the corresponding opening of the washer part causes a deformation of a portion of a second material of the washer part proximate to the corresponding opening toward the first part, wherein the deformed portion exerts a force on the second projection and prevents removal of the second projection from the corresponding opening.

2. The method of claim 1, further comprising flattening a portion of each respective first projection to cause an end portion of the respective first projection to have a first width that is greater than a second width of the corresponding second hole of the washer part.

3. The method of claim 1, wherein each respective second projection has a first width that is greater than a second width of the corresponding opening of the washer part.

4. The method of claim 3, wherein each opening of the washer part has a shape of a letter "X".

5. The method of claim 1, wherein the washer part comprises one of metal and plastic.

6. The method of claim 5, wherein the washer part comprises steel.

7. An apparatus for fastening, the apparatus comprising:
    a first part disposed on a first side of a layer of a material, the first part comprising a first central hole, a plurality of first projections, and a plurality of first holes, wherein the first projections and first holes are disposed around the first central hole;
    a washer part comprising:
        a second central hole;
        a plurality of second holes corresponding to the plurality of first projections, wherein each first projection of the first part fits through a corresponding one of the plurality of second holes; and
        a plurality of openings corresponding to the plurality of first holes of the first part;
    a second part disposed on a second side of the layer of material, the second part having a plurality of second projections, wherein each of the plurality of second projections penetrates a respective one of the plurality of openings of the washer part, wherein a portion of a second material of the washer part proximate to each opening is deformed toward the first part and exerts a force on the second projection that passes through the respective opening, wherein the force prevents removal of the second projection from the respective opening.

8. The apparatus of claim 7, wherein each first projection of the first part has a first portion that fits through a corresponding second hole of the washer part and a second portion that is flattened to have a first width greater than a second width of the corresponding second hole.

9. The apparatus of claim 7, wherein the washer part comprises one of metal and plastic.

10. The apparatus of claim 9, wherein the washer part comprises steel.

11. The apparatus of claim 7, wherein:
    the plurality of first projections are disposed symmetrically around the first central hole at respective first locations;
    the plurality of second holes are arranged symmetrically around the second central hole at respective second locations that correspond to respective first locations; and
    the plurality of openings are arranged symmetrically around the second central hole.

12. The apparatus of claim 7, wherein the second part includes a first side and a second side, wherein the second projections are disposed on the first side, wherein the second side comprises one of an engraved logo, and engraved name, and an engraved emblem.

13. A product comprising the apparatus of claim 7.

14. The product of claim 13, wherein the product comprises one of a purse, a wallet, a bag, a belt, and a hat.

* * * * *